United States Patent
Kim et al.

(10) Patent No.: US 8,356,196 B2
(45) Date of Patent: Jan. 15, 2013

(54) DISPLAY APPARATUS AND METHOD FOR SAVING POWER THEREOF

(75) Inventors: Seong-Hwan Kim, Gyeonggi-do (KR); Dong-Hyun Ham, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 12/755,577

(22) Filed: Apr. 7, 2010

(65) Prior Publication Data

US 2010/0299543 A1    Nov. 25, 2010

(30) Foreign Application Priority Data

May 25, 2009    (KR) .................. 10-2009-0045672

(51) Int. Cl.
*G06F 1/26* (2006.01)
(52) U.S. Cl. ........................ 713/320
(58) Field of Classification Search ............ 713/320
See application file for complete search history.

(56) References Cited

U.S. PATENT DOCUMENTS

| | | | | |
|---|---|---|---|---|
| 5,657,257 A | * | 8/1997 | Lee | 713/321 |
| 5,961,647 A | * | 10/1999 | Kim et al. | 713/300 |
| 6,345,364 B1 | * | 2/2002 | Lee | 713/324 |
| 6,523,127 B1 | * | 2/2003 | Takasu | 713/324 |
| 7,484,112 B2 | * | 1/2009 | Noorbakhsh et al. | 713/340 |
| 2007/0106913 A1 | * | 5/2007 | Lewis et al. | 713/300 |

* cited by examiner

*Primary Examiner* — Chun Cao
*Assistant Examiner* — Scott Snyder
(74) *Attorney, Agent, or Firm* — FIsh & Richardson P.C.

(57) ABSTRACT

A display apparatus includes: a command receiver configured to receive power on or off command from an exterior, a power supply unit configured to supply power to the display apparatus and a control unit coupled to the command receiver and the power supply unit, determining whether auxiliary power exists when the power off command is received, wherein the control unit is configured for two power saving modes.

20 Claims, 5 Drawing Sheets

DISPLAY APPARATUS AND METHOD FOR SAVING POWER THEREOF

CROSS-REFERENCE TO RELATED APPLICATIONS

The present application claims the benefit of priority under 35 U.S.C. 119 and 35 U.S.C. 365 to Korean Patent Application No. 10-2009-0045672 (filed on 25 May, 2009), which is herein incorporated by reference in its entirety.

FIELD

This disclosure relates to a display apparatus and a method for saving power thereof.

BACKGROUND

Recently, endeavor and research for reducing power consumption of home electronic appliances or display apparatuses are actively being performed. In particular, as much interest is concentrated on power management of display apparatuses, it shows a trend that endeavors for realizing a display power management system (DPMS) mode in low power consumption are actively being performed by using an auxiliary power or by applying a circuit for downing/switching an output voltage.

Meanwhile, in a display apparatus, which is connected to a computer main body to display an image, in the case where even after a power is applied to the display apparatus and a predetermined time elapses, the computer is not used, a display apparatus to insure power saving by changing the state of the display apparatus into a power saving mode is regularly used.

However, a conventional display apparatus generally consumes about 3 W to 5 W power even in the power saving mode.

In recent years, in the terms of environment protection and resource protection, a desire to reduce power consumption of the display apparatus less than 1 W is globally increasing, but its materialization is difficult under the present circumstance due to various reasons.

For instance, in present display apparatus, a microcomputer has important functions for displaying an optimal image, such as control of display parameters, detection of a functional button input signal for adjusting a monitor, and control of power saving mode. These and other functions are being performed by a power saving control circuit centered on the microcomputer.

To this end, it is necessary to supply power to the power saving control circuit centered on the microcomputer in the power saving mode, and thus, 3 W to 5 W power is generally consumed during a power saving mode under the present circumstance.

SUMMARY

In one aspect, a display apparatus includes: a command receiver configured to receive power on or off command; a power supply unit configured to supply power to the display apparatus; and a control unit coupled to the command receiver and the power supply unit, determining whether auxiliary power exists when the power off command is received, wherein the control unit is configured for two modes, in a first mode, based on a determination that the auxiliary power exists the control unit is configured to cause the apparatus corresponds to enter a first power saving mode in which the auxiliary power is supplied to the control unit and the power supplied from the power supply unit is withheld from the display apparatus and in a second mode, based on a determination that the auxiliary power does not exist, the control unit is configured to cause the apparatus corresponds to enter a second power saving mode in which the power from the power supply unit is supplied to the control unit and the power from the power supply unit is withheld from the display apparatus excluding the control unit.

In another aspect, a display apparatus includes: a command receiver configured to receive a power off command; a power supply unit configured to supply power to the display apparatus; and a control unit, coupled to the command receiver and the power supply unit, determining whether one or more than one auxiliary power suppliers exist in response to the received power off command, wherein based on a determination that one auxiliary power exists, the control unit is configured to control entering a first power saving mode in which the auxiliary power is supplied to the control unit and the power supplied from the power supply unit is not supplied to the display apparatus, and based on a determination that more than one auxiliary power supplies exist, the control unit configured to control entering a modified first power saving mode in which an auxiliary power supply having a highest priority is used to supply auxiliary power to the control unit and the power supplied from the power supply unit is not supplied to the display apparatus.

In yet another aspect, a method for saving power of a display apparatus, comprising: receiving a power-off command from a user; in response to the received power-off command, determining whether or not an auxiliary power inputted from an exterior exists; and in response to a determination that the auxiliary power exists, entering a first power saving mode in which the auxiliary power is supplied to the control unit and power supplied from the power supply unit is not supplied to the display apparatus, and in response to a determination that the auxiliary power does not exist, entering a second power saving mode in which the power from the power supply unit is supplied to the control unit and the power from the power supply unit is not supplied to the display apparatus excluding the control unit.

DETAILED DESCRIPTION

First, in the present disclosure, through terms generally used in this art at the present if possible are selected, there may be a term arbitrarily selected by the applicant in a special case. Since operation and meaning of the term arbitrarily selected by the applicant are disclosed in detail in corresponding description of the present disclosure, the present disclosure should be understood based not on the meaning of the arbitrarily selected term itself but on operation and meaning included in the arbitrarily selected term.

Figure 1:
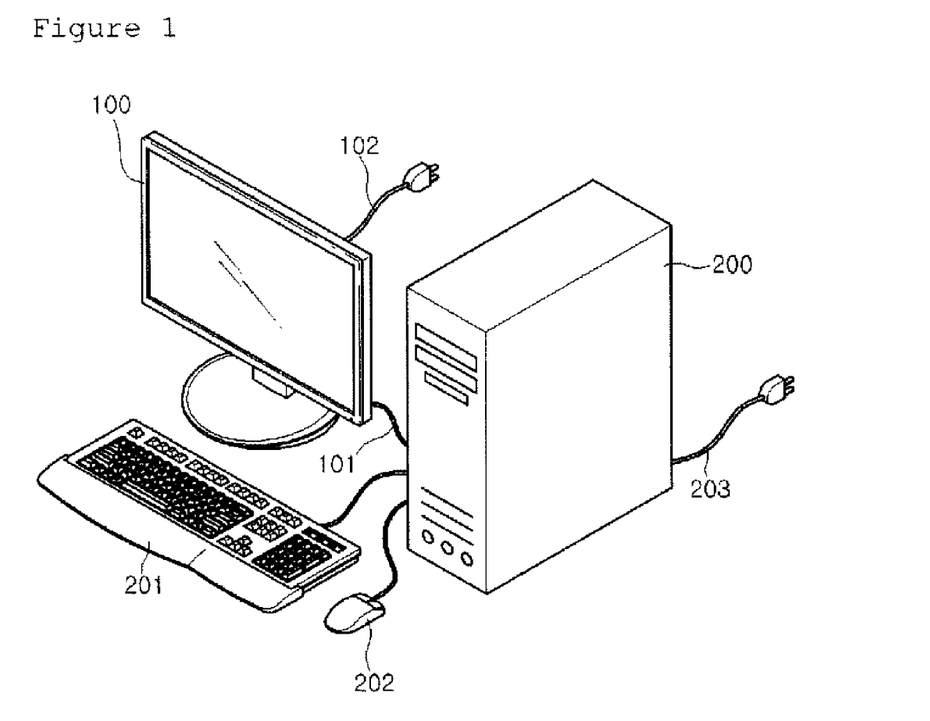
FIG. 1 is a schematic view of a computer system having a display apparatus connected thereto.

As shown in FIG. 1, a display apparatus 100 is connected with a computer main body 200 through a display signal cable 101 to display an image. AC power is supplied to the display apparatus through an AC power cable 103.

In addition to the display apparatus 100, a keyboard 201 and a mouse 202 for delivering user's commands are connected with the computer main body 200.

In addition to the keyboard 201 and the mouse 202, a printer, a separate external storage medium or the like may be connected with the computer main body 200.

Also, AC power is supplied to the computer main body 200 through an AC power cable 203.

That is, the AC power cables 102 and 203 are respectively connected with the display apparatus and the computer main body to supply corresponding AC powers to the display apparatus and the computer main body, respectively.

Figure 2:
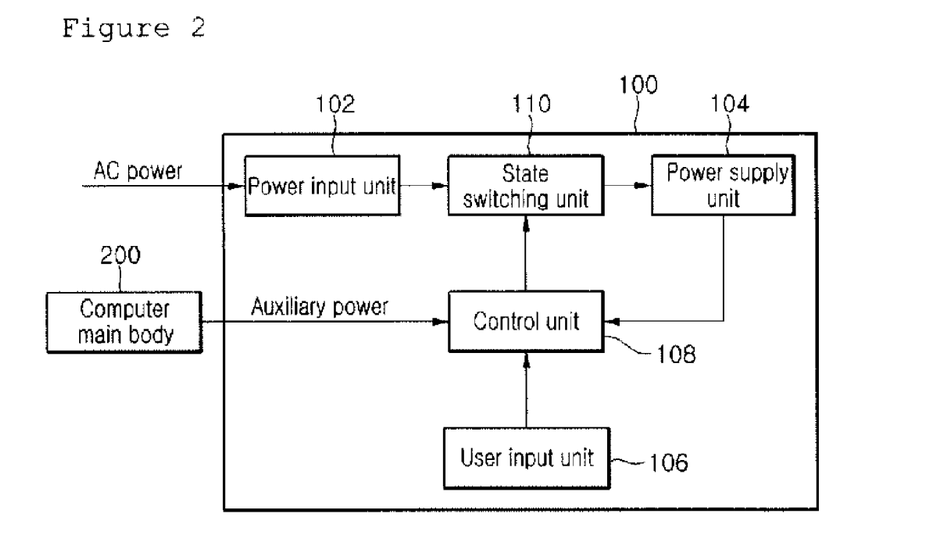
FIG. 2 is a block diagram of the display apparatus.

As shown in FIG. 2, a display apparatus 100 connected with a computer main body 200 to display an image. The display apparatus 100 includes a power input unit 102, a power supply unit 104, a user input unit 106, a control unit 108 and a state switching unit 110.

While the present implementation describes that the display apparatus 100 is connected with the computer main body 200 to display an image, implementations are not limited thereto. For example, the display apparatus 100 may be connected with a media player, such as a DVD player, a VCR or the like, to display an image. Accordingly, the computer main body 200 may be replaced by various peripheral units providing an image.

The power input unit 102 receives an input of AC power (e.g., normal power) from an exterior, which may be through the power cable 103 shown in FIG. 1. Also, the power input unit 102 may receive any input of AC power as an AC input terminal. Also, the supplied AC power has a normal voltage of 110 volts or 220 volts AC, and may be AC power having a voltage other than 110 volts or 220 volts.

The power supply unit 104 supplies a corresponding driving power to each of the blocks included in the display apparatus 100 on the basis of the AC power inputted through the power input unit 102.

The power supply unit 104 may include an input power filter, a rectifier, a power controller, a transformer, a multi-power generating unit and a power output unit.

The input power filter removes noise included in the AC power inputted through the power input unit 102 and outputs a filtered AC power. That is, the input power filter cuts off EMI introduced from AC power during the input of AC power, and an RF noise generated from an inverter and the like, and may be comprised of a coil (L) and a condenser C.

The rectifier rectifies the AC power outputted through the input power filter to a DC power. At this time, the rectifier may be made in the form of a bridge rectifying circuit for converting AC power to DC power, and is comprised of a high power factor smoothing circuit.

The power controller is driven by the rectified DC power to control supply and cut off of the input power.

The transformer is supplied a rectified power from the rectifier to transfer the power supplied to a primary winding to a secondary winding according to a control signal of the power controller. That is, the transformer repeats on/off through a switching operation of a separate switching element (FET), so that charge and discharge of DC power with respect to the primary winding are repeated. The transformer transfers an energy to the secondary winding through the charge and discharge of the primary winding.

The multi-power generating unit again rectifies the power inputted through the transformer to generate a multi-power.

The multi-power generated by the multi-power generating unit includes 24 Volts, 12 Volts, and 5 Volts.

The multi-power output unit supplies multi-powers generated by the multi-power generated unit to corresponding blocks, respectively.

The user input unit 106 receives a request command from a user, and includes a local key input unit (e.g., power switch), an infrared ray receiving unit or the like. Alternatively, the user input unit may include the local key input unit, and the local key input unit may include a power switch formed on a front side or a sidewall of the display apparatus.

For example, the user input unit 106 is turned on or off power by a user's manipulation. When the user input unit 106 is in an on-state, the display apparatus is in a power-on mode in which the display apparatus operates, and when the user input unit 106 is in an off-state, the display apparatus is in a power saving mode in which the display apparatus saves power.

The control unit 108 controls overall operations of the blocks provided in the display apparatus 100.

For example, the control unit 108 controls the display apparatus 100 to enter the power saving mode or the normal mode based on a state of the user input unit 106. The state of the user input unit 106 indicates a power on-state or a power-off state according to a user's manipulation.

When the user input unit 106 is in an off-state, (e.g., the power switch is turned off by the user's manipulation) the control unit 108 checks whether or not there exists an auxiliary power supplied from an exterior and controls to enter the first power saving mode or the second power saving mode depending on whether or not there exists an auxiliary power.

In this implementation, the display apparatus is provided therein with +5 V power supply terminal as a power for a peripheral unit.

Alternatively, the auxiliary power checked by the control unit 108 may be an auxiliary power supplied from the computer main body through the +5 V power supply terminal, or may be a 5 V auxiliary power supplied through a separate charge battery.

Also, the auxiliary power is used as a driving power for driving the control unit 108 when entering the power saving mode. Accordingly, since the power consumption of the control unit 108 is very small, it is possible to drive the control unit only with a low voltage charger.

In the implementation, the control unit 108 determines whether or not there exists an auxiliary power when the user input unit 106 is in an off-state.

Based on the checking result, when there exists an auxiliary power supplied from the computer main body 200, the control unit 108 controls to enter the first power saving mode, when there does not exist an auxiliary power supplied from the computer main body 200, the control unit 108 controls to enter the second power saving mode.

The first power saving mode is a mode that the power supply unit 104 is in an off-state, and the second power saving mode is a mode that the power supply unit 104 is in an on-state but only a minimum standby power is supplied. The first power saving mode indicates that the power supply unit 104 is completely in an off-state and accordingly there is no power supplied through the power supply unit 104.

To enter the first power saving mode as above (e.g., to switch the power supply unit to an off-state), the AC power supplied from the power input unit 102 should be cut off. Accordingly, the first power saving mode indicates a state that the input AC power is cut off.

When the display apparatus enters the first power saving mode and thus the AC power is cut off, any power is not supplied to the display apparatus. That is, the power consumption of the display apparatus in the first power saving mode is at or above 0 W.

However, even after the display apparatus enters the power saving mode, in order to determine whether or not the power saving mode is released, a minimal power should be supplied to one of the blocks of the display apparatus.

Accordingly, in the first power saving mode, the control unit 108 is driven by the auxiliary power supplied from the computer main body 200 to determine whether or not the power saving mode is released.

Also, in the case where there does not exist an auxiliary power supplied from the computer main body 200, the control unit 108 continues to maintain the AC power supply and controls to enter the second power saving mode. That is, the power supply unit 104 supplies a minimal driving power only to the control unit 108 determining whether or not to release the power saving mode.

The state switching unit 110 is turned on or off according to a control signal of the control unit 108 to switch the state of the power supply unit 104 to an on-state or an off-state. That is, the state switching unit 110 is turned off according to a control signal of the control unit 108 to cut off the power supplied from the power input unit 102 or is turned on according to the control signal of the control unit 108 to deliver AC power supplied from an exterior to the power supply unit 104.

For example, the state switching unit 110 may include a relay, which is selectively turned on/off to pass or cut off an output of the AC power.

Also, in the case where the display apparatus enters the first power saving mode but an auxiliary power supplied from the computer main body 200 does not exist, (e.g., in the case where the supplied auxiliary power is cut off), the control unit 108 releases the first power saving mode and controls to enter the second power saving mode.

Further, after the display apparatus enters the first power saving mode or the second power saving mode, when a condition for releasing the entering power saving mode is detected, the control unit 108 releases the entering power saving mode and controls the display apparatus to enter a normal operation mode.

The condition for releasing the power saving mode corresponds to a case that a power-on command is inputted through the user input unit 106 including the infrared ray receiving unit or the power switch.

That is, in the case where after the display apparatus enters the first power saving mode, a power-on command is inputted, the control unit 108 controls the state switching unit 110 to change state thereof into an on-state so that the AC power cut off for entering the first power saving mode is again supplied.

Also, in the case where after the display apparatus enters the second power saving mode, a power-on command is inputted, the control unit 108 outputs a control signal to the power supply unit 104 so that the driving power cut off for entering the second power saving mode is supplied to a corresponding block.

Figure 3:
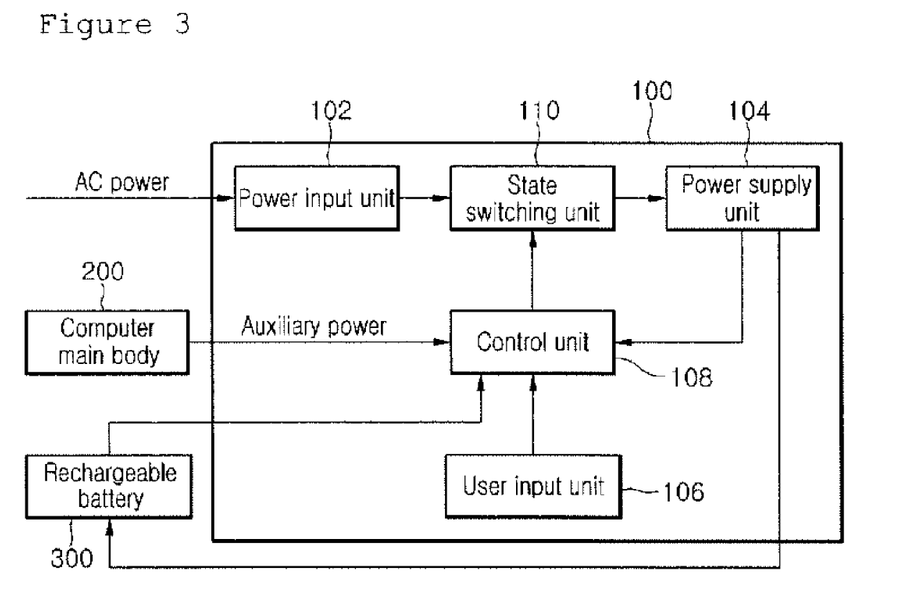
FIG. 3 is a block diagram of the display apparatus.

Referring to FIG. 3, the display apparatus further includes a rechargeable battery 300 in addition to the components constituting the display apparatus comparing to FIG. 2.

In some examples, in the display apparatus as shown in FIG. 2, to enter the power saving mode in the off-state of the user input unit 106, it is determined whether or not an auxiliary power supplied from the computer main body 200 exists. However, in the display apparatus according to this implementation, to enter the power saving mode, it is determined whether or not an auxiliary power supplied from the rechargeable battery 300 further included in the display apparatus of FIG. 3.

In other words, in entering the power saving mode, the control unit 108 determines whether or not an auxiliary power supplied from the rechargeable battery 300 exists. As a result of the determination, when the auxiliary power supplied from the rechargeable battery 300 exists, the control unit 108 controls the display apparatus to enter the first power saving mode, and when the auxiliary power supplied from the rechargeable battery 300 does not exist, the control unit 108 controls the display apparatus to enter the second power saving mode.

Also, after the display apparatus enters the first power saving mode or the second power saving mode, the control unit 108 releases the power saving mode according to an input command from the user input unit 106 and controls to enter the normal operation mode. The operation to enter the normal operation mode in this implementation is the same as that in the previous implementation.

After the display apparatus enters the normal operation mode as above, the control unit 108 controls the power supply unit 104 so that the power is supplied from the power supply unit 104 to the rechargeable battery 300 to charge the rechargeable battery 300.

Figure 4:
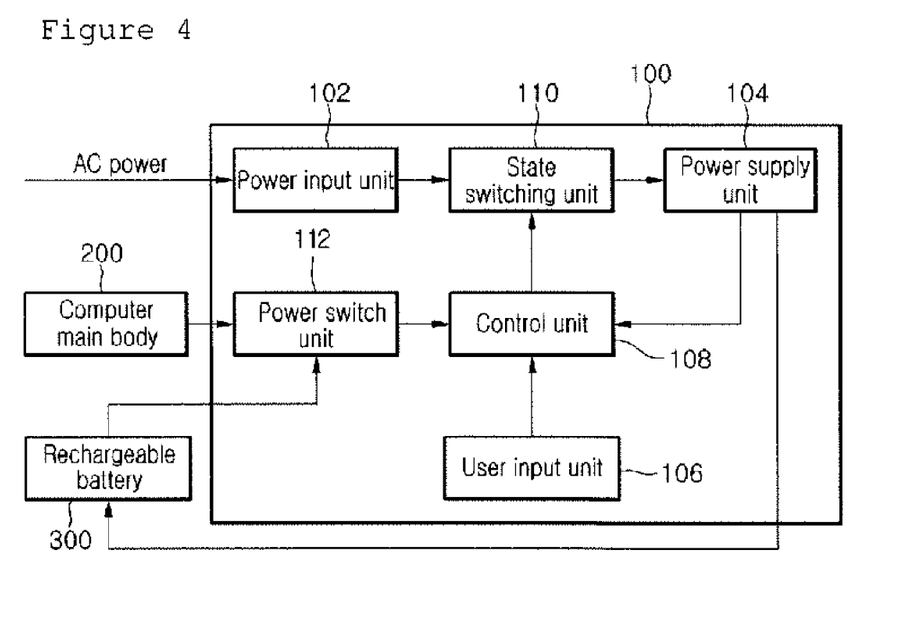
FIG. 4 is a block diagram of the display apparatus.

Referring to FIG. 4, the display apparatus further includes a power switch unit 112.

In this implementation, in the case where the display apparatus intends to enter the power saving mode, the control unit 108 determines both whether or not an auxiliary power supplied from the computer main body 200 exists, and whether or not an auxiliary power supplied from the rechargeable battery 300 exists.

And then, the control unit 108 may determine whether or not an auxiliary power supplied from the computer main body 200 exists according to a preset priority, or may determine whether or not an auxiliary power supplied from the rechargeable battery 300 exists. Accordingly, in the case where both of the auxiliary power supplied from the rechargeable battery 300 and the auxiliary power supplied from the computer main body 200 exist, the control unit 108 controls the display apparatus to enter the first power saving mode by using the auxiliary power corresponding the preset priority.

Also, upon entering the first power saving mode, the power switch unit 112 is switched such that the auxiliary power supplied from the computer main body 200 or the auxiliary power supplied from the rechargeable battery 300 is supplied to the control unit 108.

Further, in the case where the display apparatus enters the first power saving mode by using the auxiliary power supplied from the computer main body 200, the control unit 108 determines whether or not the auxiliary power supplied from the computer main body 200 has been cut off. As a result of the determination, in the case where the auxiliary power supplied from the computer main body 200 has been cut off, the control unit 108 controls the display apparatus such that the first power saving mode continues to be maintained by using the auxiliary power supplied from the rechargeable battery 300. The case that the auxiliary power supplied from the computer main body 200 has been cut off corresponds to a case that the driving power supplied to the computer main body 200 has been cut off.

Furthermore, in the case where the display apparatus enters the first power saving mode by using the auxiliary power supplied from the rechargeable battery 300, the control unit 108 determines whether or not the auxiliary power supplied from the rechargeable battery 300 has been cut off. As a result of the determination, when the auxiliary power supplied from the rechargeable battery 300 has been cut off, the control unit 108 controls the display apparatus such that the first power saving mode continues to be maintained by using the auxiliary power supplied from the computer main body 200. The case that the auxiliary power supplied from the rechargeable battery 300 has been cut off corresponds to a case that the power charged in the rechargeable battery 300 has been discharged.

Also, in a state that the display apparatus enters the first power saving mode, in the case where both of the auxiliary power supplied from the computer main body 200 and the auxiliary power supplied from the rechargeable battery 300 do not exist, the control unit 108 releases the first power saving mode and controls to enter the second power saving mode.

In addition, in a state that the display apparatus enters the power saving mode, the control unit 108 releases the power saving mode according to an input command from the user input unit 106 and controls to enter the normal operation mode.

Hereinafter, a method for saving power of the display apparatus will be described in more detail.

Figure 5:
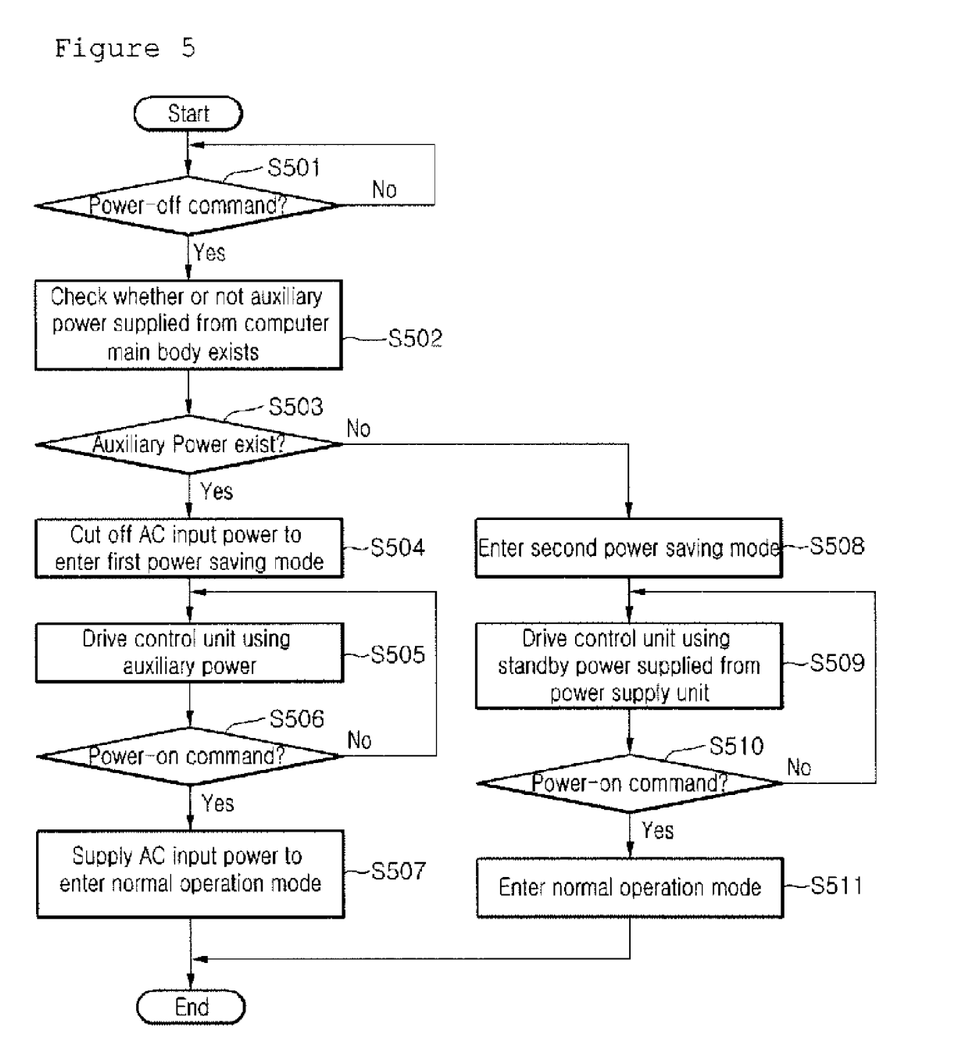
FIG. 5 is a flow chart showing a method for saving power of the display apparatus.

FIG. 5 is a flow chart showing a method for saving power of the display apparatus.

First, an initial operation of the display apparatus 100 will be described. The term "initial operation" means a state that the display apparatus 100 is connected with the computer main body 200 through the display signal cable 101, the power switch (e.g., user input unit) 106 is in an on-state, and the corresponding driving powers are supplied to the respective blocks constituting the display apparatus 100.

That is, the term "initial operation" means a state that the corresponding driving powers are supplied to the display apparatus and the respective blocks constituting the computer main body 200, the computer main body 200 supplies an image signal comprised of, for example, video signals of R (red), G (green), and B (blue), a horizontal synchronous signal (HS) and a vertical synchronous signal (VS), and +5 V auxiliary power for a peripheral unit to the display apparatus 100, and the display apparatus 100 receives the supplied image signal to display an image.

In the initial operation state as above, the control unit 108 determines whether a power-off command is inputted from an exterior (S501). That is, the control unit 108 determines whether the state of the user input unit 108 (i.e., power switch) is switched to an off-state in the normal operation state. Also, when a synchronous signal is not inputted for a predetermined time period from the computer main body 200 or a manipulation command is not inputted for a predetermined time period from the user, the control unit 108 may determine that the user input unit 106 is in an off-state.

As a result of the determination (S501), when the power-off command is inputted, the control unit 108 checks whether or not an auxiliary power supplied from the computer main body 200 exists (S502). That is, the control unit 108 checks whether or not the auxiliary power for a peripheral unit is supplied to the display apparatus 100 from the computer main body 200.

As a result of the check, the control unit 108 determines whether or not an auxiliary power supplied from the computer main body 200 exists (S503). That is, the control unit 108 checks whether or not an auxiliary power supplied from an exterior exists through a line such as through which the auxiliary power is supplied, and as a result of the check, the control unit 108 determines whether or not the auxiliary power exists.

Also, as a result of the determination (S503), when the auxiliary power supplied from the computer main body 200 exists, the control unit 108 controls the display apparatus 100 to enter the first power saving mode (S504). That is, when the auxiliary power supplied from the computer main body 200 exists, the control unit 108 transmits an off-signal to the state switching unit 110. Here, if the display apparatus operates in the normal operation mode, the state switching unit 110 may maintains the on-state.

The state switching unit 110 is turned off based on the control signal of the control unit 108, so that the AC power is not supplied to the power supply unit 104. That is, the state switching unit 110 cuts off the AC power supplied from an exterior to switch the power supply unit 104 to the off-state.

When the display apparatus operates in the normal operation mode, the control unit 108 is driven by the power supplied from the power supply unit 104. However, in the case where the display apparatus 100 enters the first power saving mode as above, since the power supply unit 104 is switched to the off-state, the control unit 108 is not supplied a corresponding driving power from the power supply unit 104. Accordingly, in the case where the display apparatus 100 enters the first power saving mode and the power supply unit 104 is switched to the off-state, the control unit 108 is driven by the auxiliary power supplied from the computer main body 200 to decide whether or not to release the first power saving mode.

That is, in the case where the display apparatus 100 enters the first power saving mode, the control unit 108 is driven by the auxiliary power supplied from the computer main body 200. At this time, the control unit 108 checks the state of the user input unit 106 according to a user's manipulation and decides whether or not to release the first power saving mode (S505).

Accordingly, the control unit 108 determines whether or not a power-on command is inputted from an exterior in the first power saving mode (S506). That is, the control unit 108 determines whether or not the state of the user input unit 106 is switched to the on-state to decide whether or not to release the first power saving mode.

When the state of the user input unit 106 is switched to the on-state, the control unit 108 releases the first power saving mode and controls the display apparatus 100 to enter the normal operation mode (S507).

That is, when the state of the user input unit 106 is switched to the on-state in the first power saving mode, the control unit 108 outputs an on-signal to the state switching unit 110.

The state switching unit 110 is turned on according to the control signal of the control unit 108 so that the AC power is again supplied to the power supply unit 104. As the state switching unit 110 is turned on as above, the state of the power supply unit 104 is also switched to the on-state, so that the corresponding driving powers are supplied to the respective blocks constituting the display apparatus 100 and thus the display apparatus 100 enters the normal operation mode.

Meanwhile, when the auxiliary power supplied from the computer main body 200 does not exist, the control unit 108 controls the display apparatus 100 to enter the second power saving mode (S508).

When the auxiliary power supplied from the exterior does not exist, the control unit 108 continues to maintain the state of the state switching unit 110 in the on-state. Also, as the display apparatus 100 enters the second power saving mode, the power supply unit 104 supplies the standby power only to a specific block (S509).

The control unit 108 is driven by the standby power supplied through the power supply unit 104 to decide whether or not to release the second power saving mode.

Thereafter, in the second power saving mode, the control unit 108 determines whether or not a power-on command is inputted from an exterior (S510). That is, the control unit 108 determines whether or not the state of the user input unit 106 is switched to the on-state to decide whether or not to release the second power saving mode.

When the state of the user input unit 106 is switched to the on-state, the control unit 108 outputs a signal for releasing the second power saving mode to control the display apparatus 100 to enter the normal operation mode.

That is, the power supply unit 104 supplies the corresponding driving powers to the respective blocks constituting the display apparatus 100 according to the control signal of the control unit 108.

As aforementioned, the operation mode is decided according to the state of the user input unit and whether or not the auxiliary power exists.

TABLE 1

| State of User Input Unit | Existence of Auxiliary Power | Operation Mode |
| --- | --- | --- |
| ON | ○ | Normal Operation Mode |
| OFF | ○ | 1st Power Saving Mode |
| ON | X | Normal Operation Mode |
| OFF | X | 2nd Power Saving Mode |

That is, as shown in table 1, the control unit 108 decides the operation mode of the display apparatus according to the state of the user input unit and the existence of auxiliary power.

In this implementation, in the case where the state of the user input unit 106 is off-state and the auxiliary power exists, it becomes possible to provide the display apparatus having 0 W power consumption.

The display apparatus and method for saving power thereof can greatly reduce power consumption in the power saving mode because a separate power does not need to be supplied to the control unit driven for releasing the power saving mode.

Figure 6:
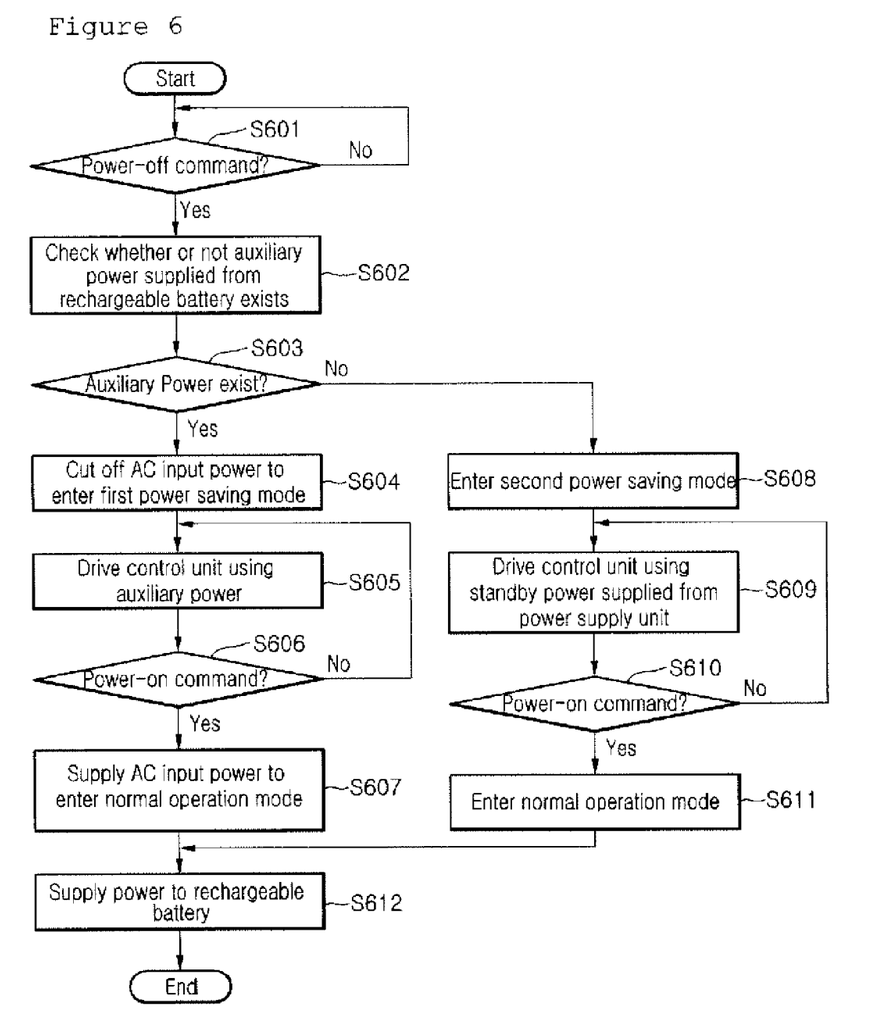
FIG. 6 is a flow chart showing a method for saving power of the display apparatus.

FIG. 6 is a flow chart showing a method for saving power of the display apparatus.

First, in an "initial operation" state of the display apparatus 100, the control unit 108 determines whether or not a power-off command is inputted from an exterior (S601). That is, the control unit 108 determines whether or not the state of the user input unit (e.g., power switch) 108 is switched to an off-state in the normal operation state. Also, the control unit 108 may determine a case that a synchronous signal is not inputted in excess of a predetermined time period from the computer main body or a manipulation command is not inputted in excess of a predetermined time period from a user, as an off-state of the user input unit 106.

As a result of the determination (S601), when the power-off command is inputted, the control unit 108 checks whether or not an auxiliary power supplied from the rechargeable battery 300 exists (S602). That is, the control unit 108 checks whether or not the rechargeable battery 300 is completely charged and a power charged in the rechargeable battery 300 exists.

As a result of the check, the control unit 108 determines whether or not an auxiliary power supplied from the rechargeable battery 300 exists (S603).

Also, as a result of the determination (S603), when the auxiliary power supplied from the rechargeable battery 300 exists, the control unit 108 controls the display apparatus 100 to enter the first power saving mode (S604). That is, when the auxiliary power supplied from the rechargeable battery 300 exists, the control unit 108 transmits an off-signal to the state switching unit 110. Here, if the display apparatus 100 operates in the normal operation mode, the state switching unit 110 may maintain the on-state.

The state switching unit 110 is turned off based on the control signal of the control unit 108, so that the AC power is not supplied to the power supply unit 104. That is, the state switching unit 110 cuts off the AC power supplied from an exterior to switch the power supply unit 104 to the off-state.

When the display apparatus operates in the normal operation mode, the control unit 108 is driven by the power supplied from the power supply unit 104. However, in the case where the display apparatus 100 enters the first power saving mode as above, since the power supply unit 104 is switched to the off-state, the control unit 108 is not supplied a corresponding driving power from the power supply unit 104. Accordingly, in the case where the display apparatus 100 enters the first power saving mode and the power supply unit 104 is switched to the off-state, the control unit 108 is driven by the auxiliary power supplied from the rechargeable battery 300 to decide whether or not to release the first power saving mode.

That is, in the case where the display apparatus 100 enters the first power saving mode, the control unit 108 is driven by the auxiliary power supplied from the rechargeable battery 300. At this time, the control unit 108 checks the state of the user input unit 106 according to a user's manipulation and decides whether or not to release the first power saving mode (S605).

Accordingly, the control unit 108 determines whether or not a power-on command is inputted from an exterior in the first power saving mode (S606). That is, the control unit 108 determines whether or not the state of the user input unit 106 is switched to the on-state to decide whether or not to release the first power saving mode.

When the state of the user input unit 106 is switched to the on-state, the control unit 108 releases the first power saving mode and controls the display apparatus 100 to enter the normal operation mode (S607).

That is, when the state of the user input unit 106 is switched to the on-state in the first power saving mode, the control unit 108 outputs an on-signal to the state switching unit 110.

The state switching unit 110 is turned on according to the control signal of the control unit 108 so that the AC power is again supplied to the power supply unit 104. As the state switching unit 110 is turned on as above, the state of the power supply unit 104 is also switched to the on-state, so that the corresponding driving powers are supplied to the respective blocks constituting the display apparatus 100 and thus the display apparatus 100 enters the normal operation mode.

Meanwhile, when the auxiliary power supplied from the rechargeable battery 300 does not exist, the control unit 108 controls the display apparatus 100 to enter the second power saving mode (S608).

When the auxiliary power supplied from the rechargeable battery 300 does not exist, the control unit 108 continues to maintain the state of the state switching unit 110 in the on-state. Also, as the display apparatus 100 enters the second power saving mode, the power supply unit 104 supplies the standby power only to a specific block (S609).

The control unit 108 is driven by the standby power supplied through the power supply unit 104 to decide whether or not to release the second power saving mode.

Thereafter, in the second power saving mode, the control unit 108 determines whether or not a power-on command is inputted from an exterior (S610). That is, the control unit 108 determines whether or not the state of the user input unit 106 is switched to the on-state to decide whether or not to release the second power saving mode.

When the state of the user input unit 106 is switched to the on-state, the control unit 108 outputs a signal for releasing the second power saving mode to control the display apparatus 100 to enter the normal operation mode.

That is, the power supply unit 104 supplies the corresponding driving powers to the respective blocks constituting the display apparatus 100 according to the control signal of the control unit 108.

Figure 7:
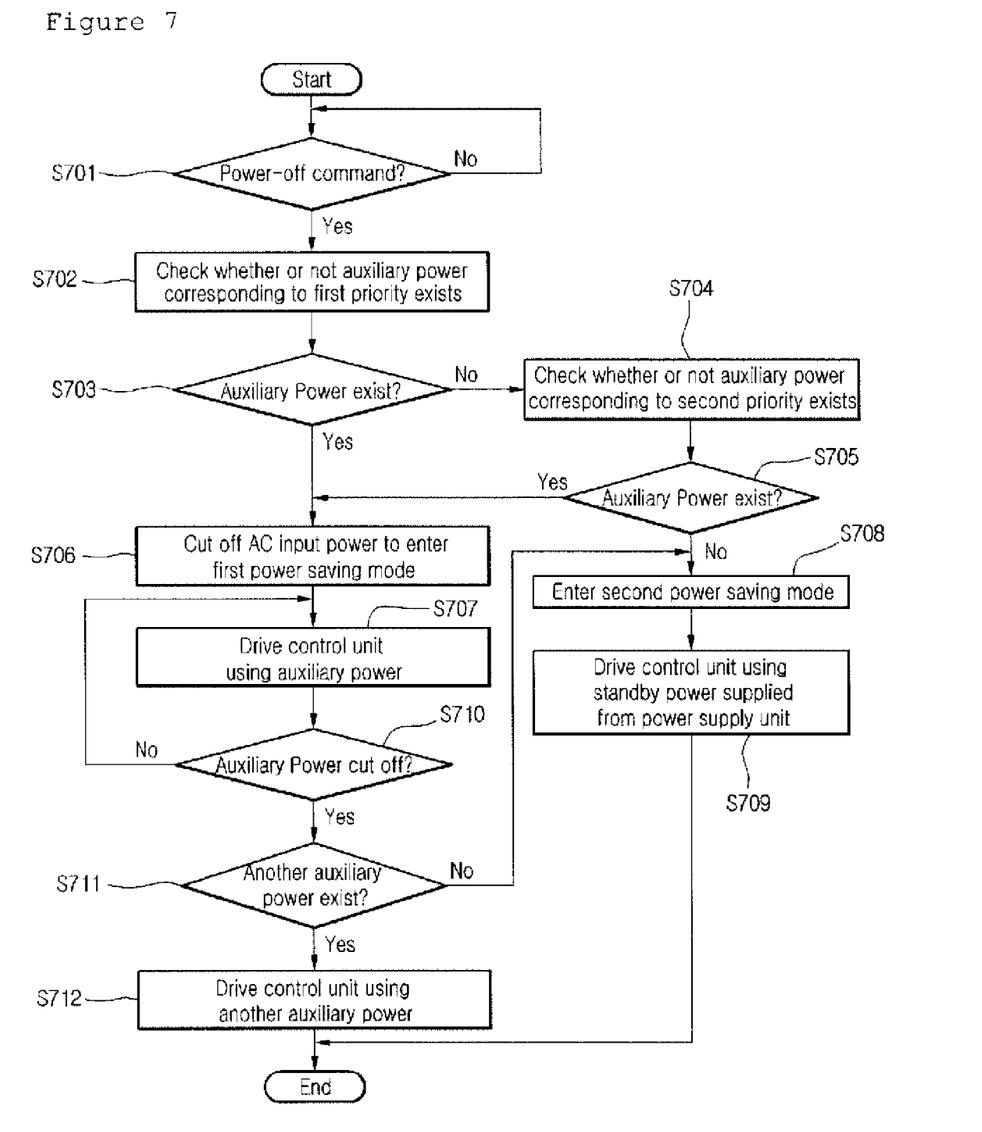
FIG. 7 is a flow chart showing a method for saving power of the display apparatus.

FIG. 7 is a flow chart showing a method for saving power of the display apparatus.

First, in an "initial operation" state of the display apparatus 100, the control unit 108 determines whether or not a power-off command is inputted from an exterior (S701). That is, the control unit 108 determines whether or not the state of the user input unit (i.e., power switch) 108 is switched to an off-state in the normal operation state. Also, the control unit 108 may determine a case that a synchronous signal is not inputted in excess of a predetermined time period from the computer main body or a manipulation command is not inputted in excess of a predetermined time period from a user, as an off-state of the user input unit 106.

As a result of the determination (S701), when the power-off command is inputted, the control unit 108 checks whether or not an auxiliary power corresponding to a first priority exists (S702). The auxiliary power includes a first auxiliary power supplied from the rechargeable battery 300, and a second auxiliary power supplied from the computer main body 200. The auxiliary power may further include a separate auxiliary power in addition to the first and second auxiliary powers. The use may set an auxiliary power to be used preferentially upon entering the power saving mode among the plurality of auxiliary powers. Also, in the case where the auxiliary power to be used preferentially is not set, the control unit 108 may arbitrarily set the priority with respect to the plurality of auxiliary powers.

As a result of the check, the control unit 108 determines whether or not an auxiliary power corresponding to the first priority exists (S703).

Also, as a result of the determination (S703), when the auxiliary power corresponding to the first priority does not exists, the control unit 108 checks whether or not an auxiliary power corresponding to a second priority exists (S704), and thus determines whether or not the auxiliary power corresponding to the second priority exists (S705).

As a result of the determination (S703), when the auxiliary power corresponding to the first priority exists, the control unit 108 controls the display apparatus 100 to enter the first power saving mode by using the first auxiliary power corresponding to the first priority (S706).

As a result of the determination (S705), when the auxiliary power corresponding to the second priority exists, the control unit 108 controls the display apparatus 100 to enter the first power saving mode by using the second auxiliary power corresponding to the second priority (S706).

That is, when the auxiliary power supplied from the rechargeable battery 300 or the auxiliary power supplied from the computer main body 200 exists, the control unit 108 transmits an off-signal to the state switching unit 110. At this time, if the display apparatus 100 operates in the normal operation mode, the state switching unit maintains the on-state.

The state switching unit 110 is turned off based on the control signal of the control unit 108, so that the AC power is not supplied to the power supply unit 104. That is, the state switching unit 110 cuts off the AC power supplied from an exterior to switch the power supply unit 104 to the off-state.

When the display apparatus operates in the normal operation mode, the control unit 108 is driven by the power supplied from the power supply unit 104. However, in the case where the display apparatus 100 enters the first power saving mode as above, since the power supply unit 104 is switched to the off-state, the control unit 108 is not supplied a corresponding driving power from the power supply unit 104. Accordingly, in the case where the display apparatus 100 enters the first power saving mode and the power supply unit 104 is switched to the off-state, the control unit 108 is driven by the auxiliary power supplied from the rechargeable battery 300 to decide whether or not to release the first power saving mode.

That is, in the case where the display apparatus 100 enters the first power saving mode, the control unit 108 is driven by the auxiliary power supplied from the rechargeable battery 300 or the computer main body 200. At this time, the control unit 108 checks the state of the user input unit 106 according to a user's manipulation and decides whether or not to release the first power saving mode (S707).

Also, when auxiliary powers corresponding to the first and second priorities do not exist, the control unit 108 controls the display apparatus 100 to enter the second power saving mode (S708).

That is, when both of the first auxiliary power and the second auxiliary power do not exist, the control unit 108 continues to maintain the state of the state switching unit 110 in the on-state. Also, as the display apparatus 100 enters the second power saving mode, the power supply unit 104 supplies the standby power only to a specific block (S709).

In the state that the display apparatus 100 enters the first power saving mode, the control unit 108 determines whether or not the supplied auxiliary power has been cut off (S710). That is, the control unit 108 determines whether the auxiliary power supplied from the computer main body 200 has been cut off or the auxiliary power supplied from the rechargeable battery 300 has been cut off. In other words, the control unit 108 determines whether the power of the computer main body has been cut off or the rechargeable battery 300 has been completely discharged.

In the case where the auxiliary power has been cut off, the control unit 108 determines whether or not another auxiliary power except for the auxiliary power, which has been cut off, exists (S711).

When the another auxiliary power exists, the control unit 108 continues to maintain the first power saving mode by using the another auxiliary power (S712).

Also, when the another auxiliary power does not exist, the control unit 108 controls the display apparatus to enter the operation (S708), which releases the first power saving mode and enter the second power saving mode.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A display apparatus, comprising:
   a command receiver configured to receive power on or off command;
   a power supply unit configured to receive AC power, and to supply power to the display apparatus by using the received AC power; and
   a control unit coupled to the command receiver and the power supply unit, configured to determine whether auxiliary power exists when the power off command is received, configured to, based on a determination that the auxiliary power exists when the power off command is received, enter a first power saving mode that powers the control unit using the auxiliary power instead of power that is available from the power supply unit by using the received AC power, and configured to, based on a determination that the auxiliary power does not exist when the power off command is received, enter a second power saving mode that powers the control unit using power from the power supply unit generated by using the received AC power, wherein the control unit is configured for two modes, in a first mode, based on a determination that the auxiliary power exists when the power off command is received, the control unit is configured to cause the apparatus to enter the first power saving mode in which the auxiliary power is withheld from the display apparatus excluding the control unit and the power supplied from the power supply unit is withheld from the display apparatus including the control unit and, in a second mode, based on a determination that the auxiliary power does not exist when the power off command is received, the control unit is configured to cause the apparatus to enter the second power saving mode in which the power from the power supply unit is supplied to the control unit and the power from the power supply unit is withheld from the display apparatus excluding the control unit.

2. The display apparatus of claim 1, further comprising:
a switching unit configured to switch between the first and second mode, the first mode in which the switching unit configures the display apparatus to output AC power to the control unit and the second mode in which the switching unit configures the displaying apparatus to prevent supply of AC power to the control unit, the switching unit switching between the first and second mode in response to a control signal provided from the control unit.

3. The display apparatus of claim 1, wherein the auxiliary power is supplied from a computer main body.

4. The display apparatus of claim 1, further comprising:
a rechargeable battery configured to supply the auxiliary power.

5. The display apparatus of claim 1, wherein the auxiliary power is supplied to the control unit from a rechargeable battery in the first power saving mode.

6. The display apparatus according to claim 2, wherein the control unit controls the switching unit to effect an off-state for the power supply unit driving the first power saving mode, and the control unit controls the switching unit to effect an on-state for the power supply unit driving the second power saving mode.

7. The display apparatus according to claim 1, wherein the control unit further controls turning on the power of the display apparatus after the power on command is received in the command receiver.

8. The display apparatus of claim 1, wherein the auxiliary power is supplied from a media player.

9. A display apparatus, comprising:
a command receiver configured to receive a power off command;
a power supply unit configured to supply power to the display apparatus; and
a control unit, coupled to the command receiver and the power supply unit, configured to determine whether one or more than one auxiliary power suppliers exist in response to the received power off command, configured to, based on a determination that one or more than one auxiliary power suppliers exist, enter a first power saving mode that powers the control unit using the one or more than one auxiliary power suppliers instead of power that is available from the power supply unit, and configured to, based on a determination that one or more than one auxiliary power suppliers does not exist, enter a second power saving mode that powers the control unit using power from the power supply unit, wherein based on a determination that one auxiliary power exists, the control unit is configured to control entering the first power saving mode in which the auxiliary power is supplied to the control unit and the power supplied from the power supply unit is not supplied to the display apparatus, and based on a determination that more than one auxiliary power supplies exist, the control unit configured to control entering a modified first power saving mode in which an auxiliary power supply having a highest priority is used to supply auxiliary power to the control unit and the power supplied from the power supply unit is not supplied to the display apparatus.

10. A display apparatus of claim 9, wherein the control unit further comprises:
based on a determination that the auxiliary power does not exist, the control unit is configured to control entering a second power saving mode in which the power from the power supply unit is supplied to the control unit and the power from the power supply unit is not supplied to the display apparatus excluding the control unit.

11. The display apparatus of claim 10, further comprising:
a switching unit configured to switch between the first and second mode in response to a control signal provided from the control unit.

12. The display apparatus of claim 9, wherein the plurality of auxiliary powers comprises a first auxiliary power supplied from a computer main body and a second auxiliary power supplied from a rechargeable battery.

13. The display apparatus according to claim 11, wherein the control unit controls the switching unit to an off-state for the power supply unit driving the first power saving mode, and the control unit controls the switching unit to an on-state for the power supply unit driving the second power saving mode.

14. The display apparatus according to claim 9, wherein the control unit further controls turning on the power of the display apparatus after a power on command receives in the command receiver.

15. The display apparatus of claim 9, wherein the auxiliary power having the higher priority is supplied from a computer main body.

16. The display apparatus according to claim 9, wherein the control unit further configured to control an auxiliary power supply having a lowest priority is used to supply auxiliary power to the control unit and the power supplied from the power supply unit is not supplied to the display apparatus when the auxiliary power having the higher priority does not exist.

17. A method for saving power of a display apparatus, comprising:
receiving a power-off command from a user;
in response to the received power-off command, determining whether or not an auxiliary power inputted from an exterior exists;
in response to a determination that the auxiliary power exists, entering a first power saving mode in which the auxiliary power is supplied to a control unit of the display apparatus instead of power that is available from a power supply unit of the display apparatus and power supplied from the power supply unit of the display apparatus is not supplied to the display apparatus, and in response to a determination that the auxiliary power does not exist, entering a second power saving mode in which the power from the power supply unit is supplied to the control unit and the power from the power supply unit is not supplied to the display apparatus excluding the control unit;

during the first power saving mode in which the auxiliary power is supplied to the control unit of the display apparatus instead of power that is available from the power supply unit of the display apparatus, determining, by the control unit, whether or not to release the first power saving mode by using the auxiliary power; and during the second power saving mode in which the power from the power supply unit is supplied to the control unit, determining, by the control unit, whether or not to release the second bower saving mode by using the power from the power supply unit.

18. The method of claim 17, further comprising:
releasing the power saving mode that has entered, according to a power-on command inputted from the exterior, and entering a normal operation mode.

19. The method of claim 17, further comprising:
when in a state that has entered the first power saving mode, the supplied auxiliary power is cut off, releasing the first power saving mode and entering a second power saving mode.

20. The method of claim 17, wherein the auxiliary power is supplied from a computer main body.

* * * * *